Feb. 23, 1965     C. L. BUTLER     3,170,756
SNAG-PROOF HOOK PROTECTORS
Filed Sept. 24, 1962
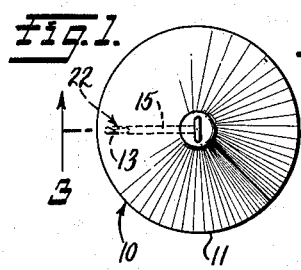
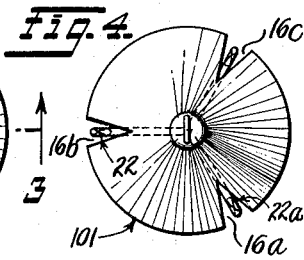
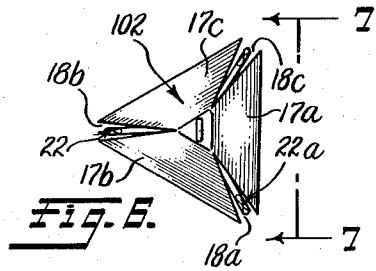
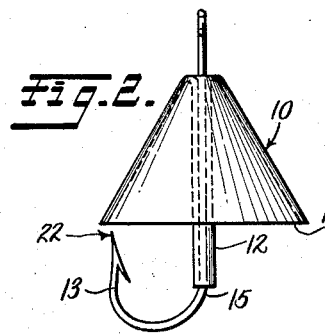
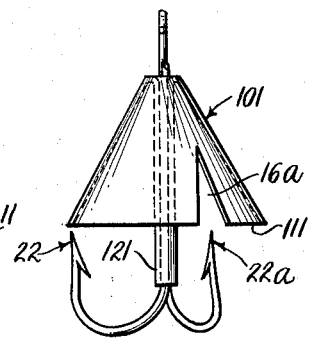
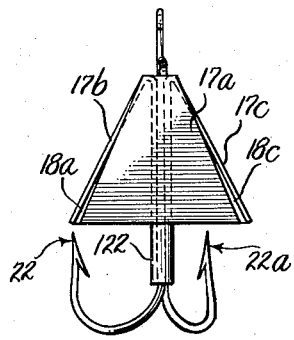
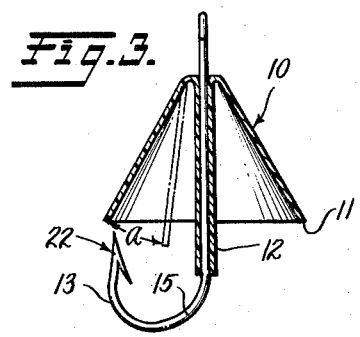
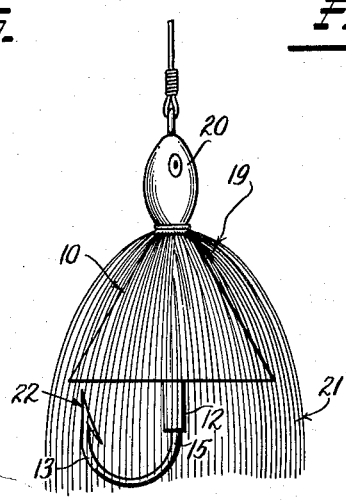
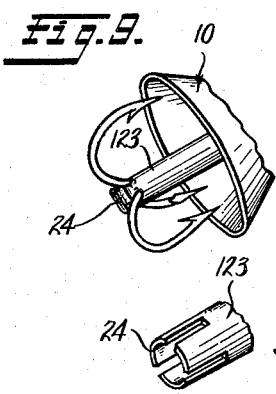
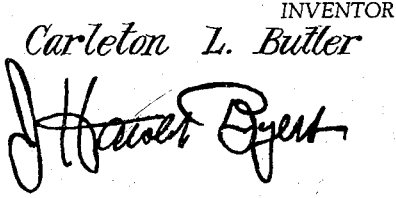
INVENTOR
Carleton L. Butler
BY

United States Patent Office 3,170,756
Patented Feb. 23, 1965

3,170,756
SNAG-PROOF HOOK PROTECTORS
Carleton L. Butler, 3002 Jennings Road, Kensington, Md.
Filed Sept. 24, 1962, Ser. No. 225,566
1 Claim. (Cl. 43—43.4)

This invention relates to fishing equipment and in particular to snag-proof hook protectors.

The loss of fishing tackle resulting from snagging of hooks on submerged vegetation and other bodies under the water surface is a common experience, especially in waters wherein there are abundant amounts of plant life, submerged three limbs, or other obstacles. The loss of tackle thereby occasioned causes inconvenience, waste of time, expense, and in some otherwise good fishing waters, snagging may practically eliminate the possibility of effective use of hook and line.

It is an object of the present invention to provide a snag-proof hook protector that will act in a positive manner to fend off objects with which the hook or hooks otherwise would become entangled.

A further object is to provide a device of this character which will not interfere with the essential function of the fishing tackle.

An additional object is the provision of a hook protector that may be employed by and at the option of the sportsman, or that on the other hand may be permanently built into a unitary hook-lure combination.

It is also an object of the present invention to provide a device of the character described which, in regard to a given size and pattern, may be fitted interchangeably to hooks of varying sizes.

Other features and advantages will become evident in the course of the following exposition.

In general the hook protector according to the present invention comprises essentially a hollow cone-shaped device formed of elastic sheet material enclosing a coaxial tubular part adapted to be slipped over the shank of a fishhook. When so assembled the conical portion flares outwardly and downwardly (assuming the hook to be oriented with the eye uppermost) and substantially symmetrically from the center line or axis so that its lower or skirt edge approaches without touching the point of the hook. By the terms "cone-shaped" and "conical" as herein used reference is had to conformation patterned on the shape of a right circular cone or an approximation thereof or on that of a polygon base pyramid, such as a trinagular base pyramid.

The elasticity of the material from which the hook protector according to the present invention is formed and the shape, size and thickness of the walls thereof should be such as to afford a sufficient degree of resilience. It is within the skill of the art to determine for any given size and configuration the elastic resistance that will resist and fend off weeds and the like, but will nonetheless yield to the strike of a fish seeking the bait. Likewise it is in applicant's preferred embodiments an objective that the sportsman will be able to bait the hook as necessary when the present protector is in place without impedence, merely by a slight pressure deflecting the edge of the flared portion. It is contemplated that the axial tube portion preferably should have sufficient give or yield as to require a modicum of force to slide the protector down over the hook shank and fix same thereon whereby rotation of the device thereafter will be negligible. For some hook and protector assemblies a relatively loose fit would be preferable.

While the hook protector according to the present invention may consist of a plurality of adjacent or connected parts, it is desirable that the entire device be formed in one integral piece. The device may be formed by extrusion processes, and if separately, the several parts may be joined by means well known to the art.

It is desired, however, to point out that in the manner of assembly of the device with the hook, there are several possibilities. It has already been pointed out that the fit of the central tubular portion may be relatively loose or comparatively tight depending upon specific requirements and type of hook. It is further within the contemplation of the present invention to provide optional methods of attachment having special reference to the lower end of the tube portion. The embodiment which at present is deemed preferable, at least for the majority of purposes, will involve a central tube portion of adjustable length. By this is meant that the tube is originally made somewhat longer, or at least of maximum usable length, with respect to the extent of shank of the particular hook with which it will be used. The sportsman then has merely to cut off with knife or clippers as much of the lower end of the tube as necessary, i.e., sufficient to permit the skirt edge to be supported at a position approaching but not touching the hook point as will hereinafter be further explained.

The protector when so installed on the hook may be removed therefrom at will, or if desired the protector may be permanently set. This can be conveniently accomplished by furnishing a slot or slots in the lower end of the tubular portion. Thereupon after drawing the protector downwardly on the hook shank for the desired distance, the tip ends, which will then project beyond the curved portion of the hook or hooks, may be sealed by heat. The latter can be a factory operation or can be accomplished by the fisherman in the field by the simple expedient of heating the end of the tubular portion with a lighted match.

In order that the concepts and features of the invention may be understood to better advantage reference may now be had to the accompanying drawings.

FIG. 1 is a plan view of the hook protector according to the present invention.

FIG. 2 is a side view of the hook protector shown in FIG. 1.

FIG. 3 is a view in section taken along the line 3—3 of FIG. 1.

FIG. 4 is a plan view of the modified form of the hook protector according to the present invention.

FIG. 5 is a side view of the hook protector shown in FIG. 4.

FIG. 6 is a plan view of a variant form of the hook protector according to the present invention.

FIG. 7 is a side elevational view of the hook protector of FIG. 6, looking in the direction of the arrows 7—7.

FIG. 8 is a side view of a hook protector according to the present invention showing same in combination with a lure device.

FIG. 9 is a perspective view of a modified form hook protector according to the present invention.

FIG. 10. is an enlarged fragmentary perspective view of the shank portion of the hook protector of FIG. 9, showing the slots therein before sealing.

In FIGS. 1, 2 and 3 the hook protector shown consists of a conical hood portion 10, terminating in a flaring skirt portion 11 and provided with a coaxial tubular portion 12. The hook protector in this illustration serves to protect and is illustrated in conjunction with a single-barb fishhook 13 of conventional design, over the shank 14 of which the tube 12 has been drawn. It will be observed that the length of the tubular portion 12, and the height of the skirt portion 11, are in a location and relative position such that the lower end of the tubular portion rests at the beginning of the curve 15 of the hook. Viewed as approached from above, the edge of the skirt 11 approaches but does not touch, and is slightly above the point of the hook. The purpose of this may most clearly be understood by reference to FIG. 3 wherein the side of the skirt is shown as having been depressed inwardly as would be the case if the same was pushed inward for baiting the hook or if struck by a fish. The clearance of the edge of skirt 11 when depressed inwardly with respect to the point of the hook is in this embodiment very minute. In addition the skirt 11 flares outwardly so as to be spaced slightly beyond the point of the hook.

The angle *a* in FIG. 3 represents an approximate deflection that could be expected when the baited hook received a strike from a fish.

As has above been set forth, the hook protector illustrated is constructed from relatively thin, resilient material, stiff enough to fend off weeds and the like, but yieldable enough to permit bending for baiting and for access by a fish to the bait.

In FIGS. 4 and 5 the hood portion 101 in general conformation is similar to hood 10 of FIGS. 1 to 3, with the difference that the skirt portion 111 is slashed with slits 16a, 16b and 16c extending part way up. Whereas in FIGS. 4 and 5 there is illustrated a triple-barb or snag hook, it will be understood that the slitted hood is adaptable to a single-barb hook, and that the slits may number one, two, or three or even more if desired. Moreover the hood type of FIGS. 1 to 3 may be used with a multiple barb hook if desired.

FIGS. 6 and 7 are illustrative of a type of hook protector of conical conformation, but wherein the cone is not a right circular cone as in FIGS. 1 to 5 but is constructed with three flat sides or walls 17a, 17b and 17c. Like the embodiment of FIGS. 4 and 5, the hood 102 is partially divided by slits 18a, 18b and 18c.

Where, as in the latter illustrated embodiments, slits are provided, it is preferable to rotate the cone to a position which will bring the slit or slits directly over the respective point or points 22 and 22a, so that the latter are substantially centrally aligned with regard to the respective slits. In these embodiments the edge of the skirt may be on a horizontal line or even slightly below the point of the hook or hooks. In the drawings a separation is shown for purposes of clarity.

In FIG. 8 a device in accordance with the present invention is shown in combination with a fish lure 19 of conventional design consisting of a simulated head portion 20 and trailing filaments 21.

FIG. 9 shows a modified form of hook protector wherein the tubular portion 123 has been sealed over the hook shank, which in this case is a triple shank.

The hook portions 10, 101 and 102 are shown as being integral with the tube portions 12, 121, 122 and 123.

In addition to being resilient, the material of which the hook protector is made should have a sufficient resistance to water or should be treated to have sufficient resistance, so that the elasticity of the material is not lost by soaking for prolonged periods in water.

The described device will find very great use in waters infested with weeds and water plants, and also where more resistant submerged objects are encountered, such as logs.

While for most purposes clear transparent plastic is deemed advantageous, the use of colored or fluorescent or phosphorescent plastic is optional, and may be preferred.

In practice the device may be manufactured and marketed in one piece with a lure portion. Or if desired, the lure may be a separate item therefrom.

In the embodiment of FIG. 9, the tip end 24 of the tube 123 originally was provided with a slit or groove (not shown) for each hook shank. In this example, the tube is placed over the hook shank at the upper end (the eye) and drawn down until the tip ends extend beyond the shank and the hood 10 is in the desired position. The tip ends then may be clipped if necessary to eliminate any excess material, and heated to effect a seal. While heated a pressure may be applied. A simple way to effect simultaneous heating and sealing is to heat the jaws of a pair of pliers and therewith squeeze the ends together.

Having described and illustrated by invention, what I desire to claim and protect by Letters Patent follows:

A snag-proof hook assembly comprising a hook and a hook protector, said hook having a plurality of shanks and barbs, said hook protector comprising a hollow conical hood portion and a tubular structure having an outer circumference slightly larger than the periphery of said shanks, and an internal diameter substantially equal to the diameter of said shanks, said tubular structure being closely fitted around the shanks of said hook, and being slightly longer than said shanks, whereby a portion of said tubular structure extends beyond said shanks, said hook protector being formed of resilient heat sealable plastic sheet material, said tubular structure being inside and substantially coaxial with said conical hood portion, the extending portion of said tubular structure being heat sealed over and beyond said shank and around the beginning of the bight of said hook, whereby dislodgement from said hook, of said hook protector is obviated, the edge of the base of said conical portion, when deflected, clearing the point of said hook by a minute distance.

References Cited by the Examiner

UNITED STATES PATENTS

| 2,332,400 | 10/43 | Richardson | 43—42.1 |
| 2,476,733 | 7/49 | Jacobs | 43—42.1 |
| 2,589,435 | 3/52 | Roeben | 43—43.4 |
| 2,605,575 | 8/52 | Ebert | 43—42.1 |
| 2,739,352 | 3/56 | Watson | 18—596 |
| 2,913,849 | 11/59 | Rolstone | 43—42.41 |

FOREIGN PATENTS 798,898  7/58  Great Britain.

ABRAHAM G. STONE, *Primary Examiner.*

MELVIN D. REIN, *Examiner.*